US012286886B2

(12) United States Patent
Hartnagel et al.

(10) Patent No.: US 12,286,886 B2
(45) Date of Patent: Apr. 29, 2025

(54) TURBINE ASSEMBLY WITH SPRING BIASED CLEARANCE SENSOR MOUNT

(71) Applicant: Rolls-Royce North American Technologies Inc., Indianapolis, IN (US)

(72) Inventors: Brett Hartnagel, Indianapolis, IN (US); Brandon R. Snyder, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/372,437

(22) Filed: Sep. 25, 2023

(65) Prior Publication Data

US 2025/0101875 A1 Mar. 27, 2025

(51) Int. Cl.
*F01D 11/20* (2006.01)
*F01D 11/00* (2006.01)

(52) U.S. Cl.
CPC ............ *F01D 11/20* (2013.01); *F01D 11/001* (2013.01); *F01D 11/005* (2013.01); *F05D 2270/821* (2013.01)

(58) Field of Classification Search
CPC .......... F01D 11/16; F01D 11/22; F01D 11/24; F01D 11/14; F01D 11/20; F01D 21/003; F01D 17/02; F05D 2270/821
See application file for complete search history.

(56) References Cited

U.S. PATENT DOCUMENTS 4,330,234 A * 5/1982 Colley .................... F01D 11/22 415/173.2
5,018,942 A 5/1991 Ciokajlo et al.
5,203,673 A 4/1993 Evans
7,207,769 B2 * 4/2007 Tanioka .................. F01D 17/02 415/118
7,414,413 B2 8/2008 Crum
7,455,495 B2 11/2008 Leogrande
7,540,704 B2 6/2009 Shang
7,922,441 B2 4/2011 Shang
8,322,973 B2 12/2012 Shang
8,827,630 B2 9/2014 Shang
8,894,358 B2 11/2014 Bacic
(Continued)

FOREIGN PATENT DOCUMENTS

CN 108168491 6/2018
CN 114294068 4/2022

OTHER PUBLICATIONS

Yu et al., A review of blade tip clearance-measuring technologies for gas turbine engines, Measurement and Control, Mar. 2020, vol. 53(3-4) 339-357.

*Primary Examiner* — David E Sosnowski
*Assistant Examiner* — Maxime M Adjagbe
(74) *Attorney, Agent, or Firm* — Barnes & Thornburg LLP

(57) ABSTRACT

A turbine assembly includes a bladed rotor mounted for rotation about an axis of the gas turbine engine, a case assembly, and an actively-cooled tip clearance system. The tip clearance system includes a tip clearance sensor located radially outward of an inner case of the case assembly. The actively-cooled tip clearance system includes a sensor is configured to monitor a tip clearance formed between the bladed rotor and the case assembly during operation of the gas turbine engine.

20 Claims, 5 Drawing Sheets

(56) References Cited

U.S. PATENT DOCUMENTS

| | | | | |
|---|---|---|---|---|
| 9,513,117 | B2 | 12/2016 | Ruhge | |
| 9,562,440 | B2 | 2/2017 | Marocchini et al. | |
| 10,222,200 | B2 * | 3/2019 | Hatcher, Jr. | G01B 11/14 |
| 10,393,149 | B2 | 8/2019 | Mondal | |
| 11,225,880 | B1 * | 1/2022 | Shoemaker | F01D 17/02 |
| 11,248,495 | B2 | 2/2022 | Schleif et al. | |
| 11,519,298 | B2 | 12/2022 | Schleif et al. | |

* cited by examiner

TURBINE ASSEMBLY WITH SPRING BIASED CLEARANCE SENSOR MOUNT

FIELD OF THE DISCLOSURE

The present disclosure relates generally to gas turbine engines, and more specifically to rotor tip gap systems.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades which may incorporate a shroud move in close proximity to blade tracks that are attached to, or incorporated into the inner diameter of the turbine case arranged around the rotating wheel assemblies.

During operation, the tips of the blades included in the rotating wheel assemblies move inwardly and outwardly relative to a centerline of the engine due to changes in centrifugal force and temperatures experienced by the blades and the wheel. Similarly, the case and blade tracks may also move inwardly and outwardly relative to a center axis of the gas turbine engine due to changes in temperature during engine operation. Because of this movement inwardly and outwardly relative to the centerline, the case around the blades may be designed to minimize clearance between the blade tips and the blade tracks. This clearance may allow combustion products to pass over the blade tips without pushing the blades, thereby contributing to lost performance within a gas turbine engine.

SUMMARY

The present disclosure may comprise one or more of the following features and combinations thereof.

A turbine assembly adapted for use in a gas turbine engine may include a bladed rotor, a case assembly, and a tip clearance. The bladed rotor may be mounted for rotation about an axis of the gas turbine engine. The case assembly may extend circumferentially around the bladed rotor.

In some embodiments, the case assembly may include an inner case and an outer case. The inner case may extend circumferentially around the bladed rotor to define an outer boundary of a gas path of the turbine assembly to block combustion products from moving through the gas path of the turbine assembly without interaction with blades included in the bladed rotor. The outer case may extend circumferentially around the inner case. The outer case may be spaced radially outward of the inner case to define an annular plenum therebetween.

In some embodiments, the tip clearance system may include a tip clearance sensor and a sensor mount. The tip clearance sensor may be located in the annular plenum to engage the inner case radially outward of the gas path of the turbine assembly. The tip clearance sensor may be configured to monitor a tip clearance formed between the bladed rotor and the inner case during operation of the gas turbine engine. The sensor mount may extend between the outer case and the tip clearance sensor to apply a bias force to the tip clearance sensor to urge the tip clearance sensor radially inward into engagement with the inner case and maintain the engagement between the tip clearance sensor and the inner case.

In some embodiments, the tip clearance sensor may extend radially outward through the outer case. The sensor mount may include a mount bracket and at least one bias element. The mount bracket may be coupled to the outer case radially outward of the outer case. The least one bias element may be arranged radially between the mount bracket and the tip clearance sensor to apply the bias force to the tip clearance sensor to urge the tip clearance sensor radially inward into engagement with the inner case.

In some embodiments, the sensor mount may further include a collar coupled to the tip clearance sensor. The collar may be coupled to the tip clearance sensor to define a shoulder surface. The at least one bias element may be arranged radially between the mount bracket and the collar.

In some embodiments, the sensor mount may further include a cover plate and a seal member. The cover plate may be coupled to the outer case radially inward of the collar to locate the at least one bias element and the collar radially between the mount bracket and the cover plate. The seal member may be arranged to extend between the cover plate and the tip clearance sensor to seal therebetween. In some embodiments, the at least one bias element may be arranged directly between the mount bracket and the tip clearance sensor to apply the bias force to the tip clearance sensor.

In some embodiments, the sensor mount may further include a cover plate and a seal member. The cover plate may be coupled to the mount bracket radially outward of the mount bracket. The seal member may be arranged to extend between the cover plate, the mount bracket, and the tip clearance sensor to seal therebetween.

In some embodiments, the tip clearance sensor may include a main housing body that engages the inner case and at least one shaft. The at least one shaft may extend radially outward away from the main housing body to the sensor mount.

In some embodiments, the sensor mount may include a mount bracket and a bias element. The mount bracket may be coupled to the outer case radially outward of the outer case. The bias element may be arranged around the at least one shaft of the tip clearance sensor and radially between the mount bracket and the tip clearance sensor to apply the bias force to the tip clearance sensor to urge the tip clearance sensor radially inward into engagement with the inner case.

In some embodiments, the tip clearance sensor includes at least two shafts that each extend radially outward from the sensor housing, and wherein the sensor mount includes a mount bracket coupled to the outer case radially outward of the outer case and a bias element arranged in a gap formed between the at least two shafts to locate the bias element radially between the mount bracket and the tip clearance sensor to apply the bias force to the tip clearance sensor to urge the tip clearance sensor radially inward into engagement with the inner case.

In some embodiments, the sensor mount may include at least one bias element. The bias element may be configured to apply the bias force to the tip clearance sensor to urge the tip clearance sensor radially inward into engagement with the inner case. The at least one bias element may be one of a conical spring washers, a conical spring, a coil spring, a wave spring, a leaf spring, and a bellows seal.

According to another aspect of the present disclosure, a gas turbine engine may include a compressor configured to compress air drawn in to the gas turbine engine and discharge pressurized air, a combustor configured to mix fuel with the pressurized air from the compressor and ignites the fuel to produce hot, high pressure combustion products, and a turbine assembly configured to receive the combustion products and to extract mechanical work form the combustion products as the combustion products move through the turbine assembly. The turbine assembly may include a bladed rotor mounted for rotation about an axis of the gas turbine engine, a case assembly that extends circumferentially around the bladed rotor, and a tip clearance system.

In some embodiments, the case assembly may include an inner case and an outer case. The inner case may extend circumferentially around the bladed rotor. The outer case may extend circumferentially around the inner case. The outer case may be spaced radially outward of the inner case to define an annular plenum therebetween.

In some embodiments, the tip clearance system may include a tip clearance sensor and a sensor mount. The tip clearance sensor may be located in the annular plenum to engage the inner case. The tip clearance sensor may be configured to monitor a tip clearance formed between the bladed rotor and the inner case during operation of the gas turbine engine. The sensor mount may extend between the outer case and the tip clearance sensor to apply a bias force to the tip clearance sensor to urge the tip clearance sensor radially inward into engagement with the inner case and maintain the engagement between the tip clearance sensor and the inner case.

In some embodiments, the tip clearance sensor may extend radially outward through the outer case. The sensor mount may include a mount bracket and at least one bias element. The sensor mount may be coupled to the outer case radially outward of the outer case. The least one bias element may be arranged radially between the mount bracket and the tip clearance sensor to apply the bias force to the tip clearance sensor to urge the tip clearance sensor radially inward into engagement with the inner case.

In some embodiments, the sensor mount may further include a collar, a cover plate, and a seal member. The collar may be coupled to the tip clearance sensor to define a shoulder surface and the at least one bias element is arranged radially between the mount bracket and the collar. The cover plate may be coupled to the outer case radially inward of the collar to locate the at least one bias element and the collar radially between the mount bracket and the cover plate. The seal member may be arranged to extend between the cover plate and the tip clearance sensor to seal therebetween. In some embodiments, the at least one bias element may be arranged directly between the mount bracket and the tip clearance sensor to apply the bias force to the tip clearance sensor.

In some embodiments, the sensor mount may further include a cover plate and a seal member. The cover plate may be coupled to the mount bracket radially outward of the mount bracket. The seal member may be arranged to extend between the cover plate, the mount bracket, and the tip clearance sensor to seal therebetween.

In some embodiments, the tip clearance sensor may include a main housing body that engages the inner case and at least one shaft. The at least one shaft may extend radially outward away from the main housing body to the sensor mount.

In some embodiments, the sensor mount may include a mount bracket and a bias element. The mount bracket may be coupled to the outer case radially outward of the outer case. The bias element may be arranged around the at least one shaft of the tip clearance sensor and radially between the mount bracket and the tip clearance sensor to apply the bias force to the tip clearance sensor to urge the tip clearance sensor radially inward into engagement with the inner case.

In some embodiments, the tip clearance sensor may include at least two shafts that each extend radially outward from the sensor housing. The sensor mount may include a mount bracket coupled to the outer case radially outward of the outer case and a bias element arranged in a gap formed between the at least two shafts to locate the bias element radially between the mount bracket and the tip clearance sensor to apply the bias force to the tip clearance sensor to urge the tip clearance sensor radially inward into engagement with the inner case.

In some embodiments, the sensor mount may include at least one bias element configured to apply the bias force to the tip clearance sensor to urge the tip clearance sensor radially inward into engagement with the inner case. The at least one bias element may be one of a conical spring washer, a conical spring, a coil spring, a wave spring, a leaf spring, and a bellows seal.

According to another aspect of the present disclosure, a method may include providing a turbine assembly adapted for use in a gas turbine engine. The turbine assembly may include a bladed rotor mounted for rotation about an axis of the gas turbine engine, a case assembly, and a tip clearance system.

In some embodiments, the case assembly may include an inner case and an outer case. The inner case may extend circumferentially around the bladed rotor. The outer case may extend circumferentially around the inner case. The outer case may be spaced radially outward of the inner case to define an annular plenum therebetween.

In some embodiments, the tip clearance system may include a tip clearance sensor and a sensor mount. The tip clearance sensor may be located in the annular plenum to engage the inner case. The tip clearance sensor may be configured to monitor a tip clearance formed between the bladed rotor and the inner case during operation of the gas turbine engine. The sensor mount may extend between the outer case and the tip clearance sensor to couple the tip clearance sensor to the case assembly.

In some embodiments, the method may further include applying a bias force to the tip clearance sensor. The bias force may be applied to the tip clearance sensor to urge the tip clearance sensor radially inward into engagement with the inner case and maintain the engagement between the tip clearance sensor and the inner case.

These and other features of the present disclosure will become more apparent from the following description of the illustrative embodiments.

DETAILED DESCRIPTION OF THE DRAWINGS

Figure 1:
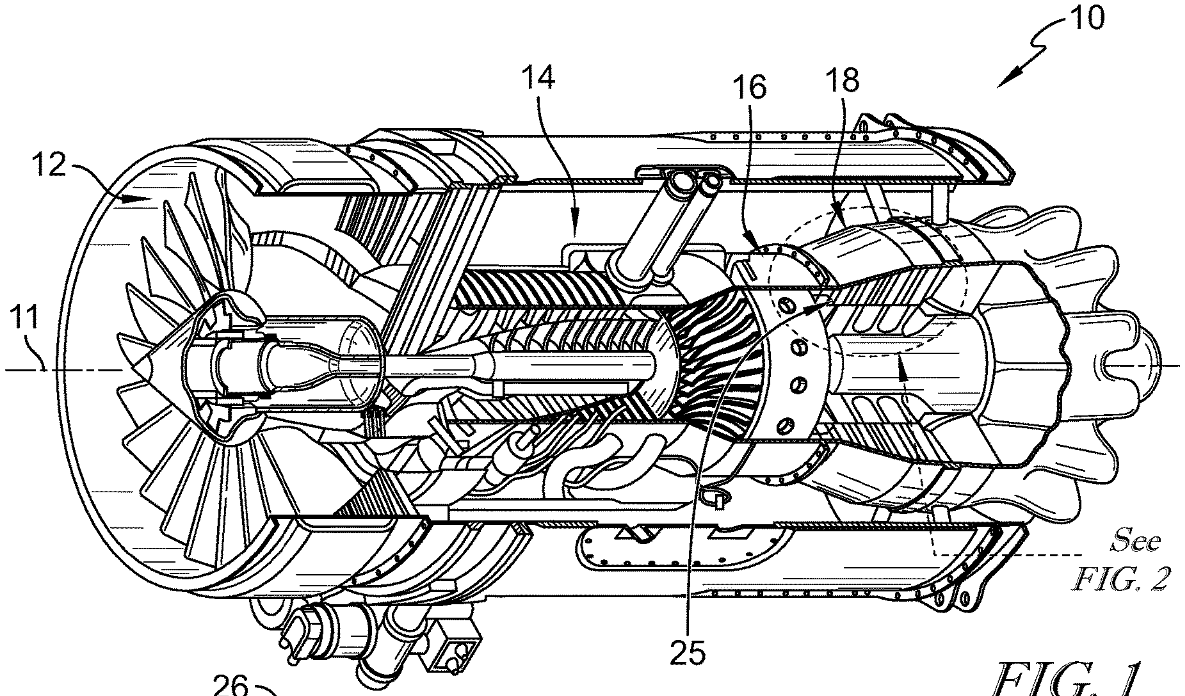
FIG. 1 is a cutaway perspective view of a gas turbine engine that includes a fan, a compressor, a combustor, and a turbine, the turbine including a turbine section comprising a plurality of bladed rotor assemblies configured to rotate about a central axis of the gas turbine engine and a plurality of static vane assemblies in between each bladed rotor assembly.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
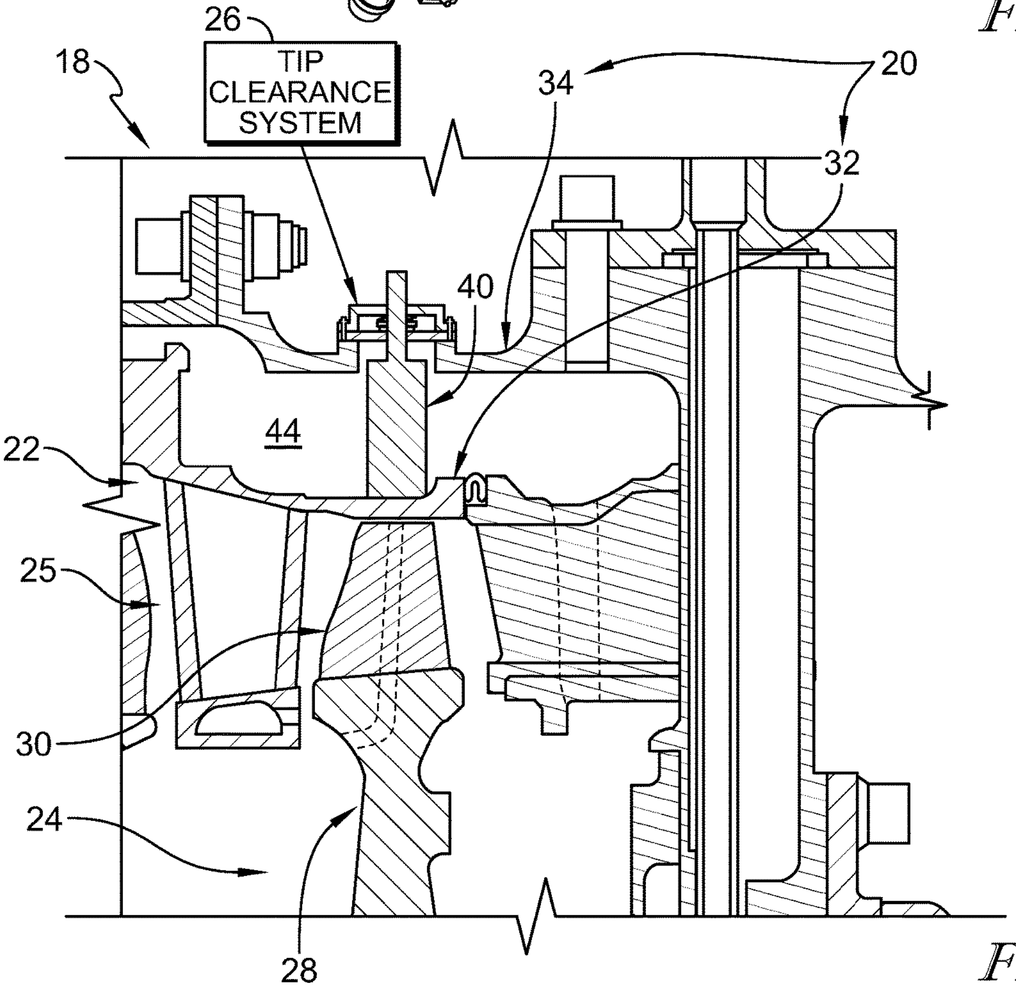
FIG. 2 is a cross-sectional view of a portion of the turbine section of the gas turbine engine of FIG. 1 showing the turbine section further includes a case assembly having an inner case that extends circumferentially around the bladed rotor assemblies and static vanes assemblies to define an outer boundary of a gas path of the gas turbine engine and an outer case that extends circumferentially around the inner case radially outward of the inner case and a tip clearance system configured to monitor the blade tip clearance between the bladed rotor and the case assembly.

The turbine 18 includes a case assembly 20, static turbine vane assemblies 22, rotating bladed rotor assemblies 24 between adjacent turbine vane assemblies 22, and a tip clearance system 26 as shown in FIG. 2. The case assembly 20 extends circumferentially around the central axis 11 of the gas turbine engine 10. Each bladed rotor assembly 24 has a rotor 28 mounted for rotation about the axis 11 of the gas turbine engine 10 and a plurality of blades 30 coupled to the rotor 28 for rotation therewith. The tip clearance system 26 is configured to monitor the blade tip clearance T as shown in FIG. 3 between the bladed rotor 24 and the case assembly 20.

Figure 3:
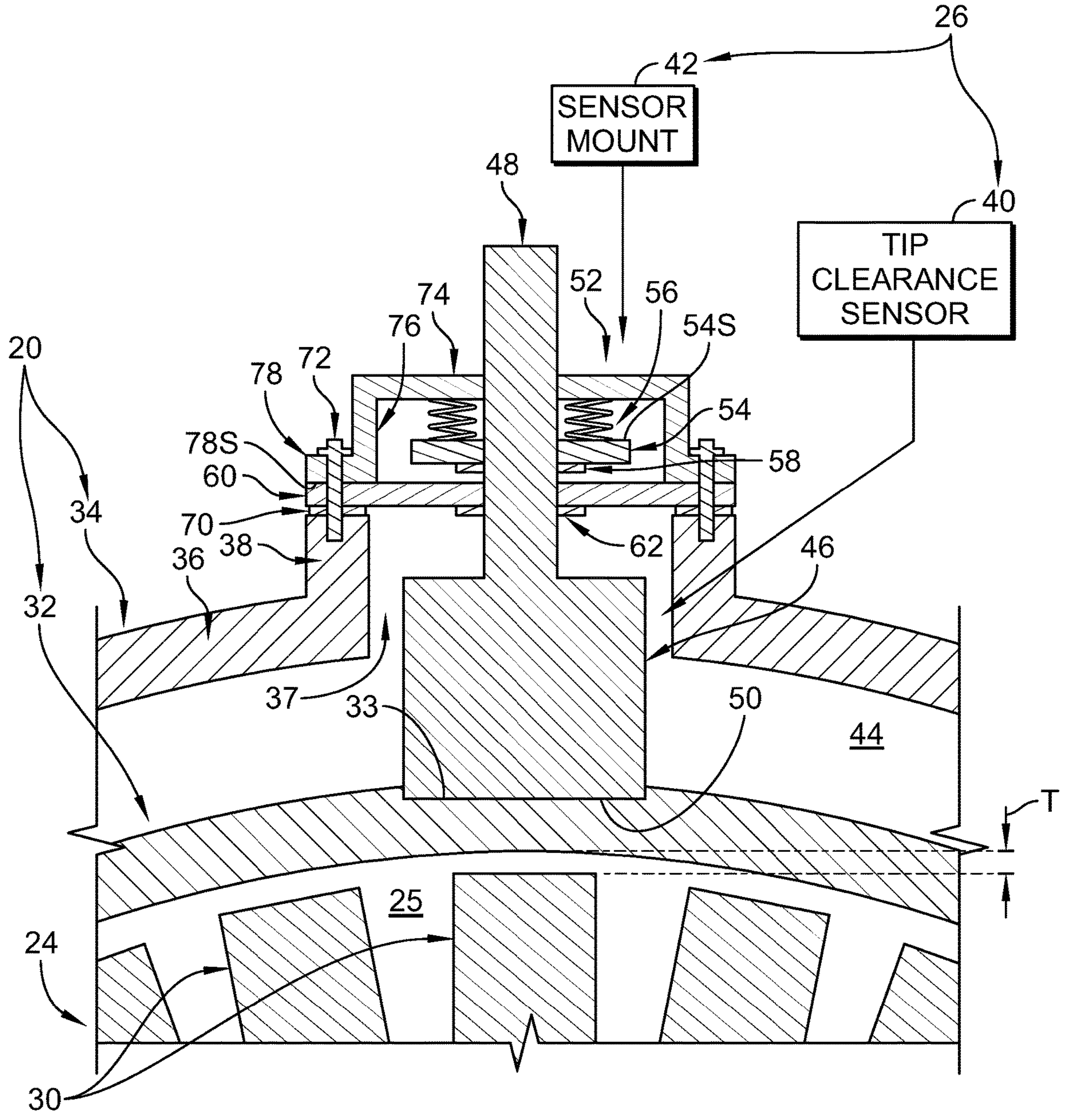
FIG. 3 is a cross-section view of the turbine section of FIG. 2 showing the tip clearance system a tip clearance sensor located in the annular cooling plenum to engage the inner case and a sensor mount that extends between the outer case and the sensor to apply a bias force to the sensor to urge the sensor radially inward into engagement with the inner case and maintain the engagement between the sensor and the inner case, and further showing the sensor mount includes a mount bracket coupled to the outer case radially outward of the outer case, a collar coupled to the sensor to define a shoulder surface, and a bias element arranged radially between the mount bracket and the collar to apply the bias force to the sensor to urge the sensor radially inward into engagement with the inner case.

The case assembly 20 includes an inner case 32 and an outer case 34 as shown in FIGS. 2 and 3. The inner case 32 extends circumferentially around the bladed rotor 24 to define an outer boundary of a gas path 25 of the turbine assembly 18. The inner case 32 extends circumferentially around the bladed rotor 24 to block combustion products from moving through the gas path 25 of the turbine assembly 18 without interaction with the blades 30 on the bladed rotor 24. The outer case 34 extends circumferentially around the inner case 32 radially outward of the inner case 32.

The tip clearance system 26 includes a tip clearance sensor 40 and a sensor mount 42 as shown in FIGS. 2 and 3. The tip clearance sensor 40 is located in an annular plenum 44 defined between the inner case 32 and the outer case 34 of the case assembly 20 to engage the inner case 32 radially outward of the gas path 25 of the turbine assembly 18. The sensor mount 42 couples the sensor 40 to the outer case 34. The sensor mount 42 extends between the outer case 34 and the sensor 40 to apply a bias force to the sensor 40 to urge the sensor 40 radially inward into engagement with the inner case 32 and maintain the engagement between the sensor 40 and the inner case 32.

The distance between the tips of the blades included in the bladed rotor 24 and the surrounding case may be important to gas turbine engine performance. Sensors 40 may be used to monitor the tip clearance T during engine operation. Sensors 40 may also be incorporated into an active control system which may measure and adjust the turbine tip clearance T for optimum performance.

The sensor 40 is configured to monitor a tip clearance T formed between the bladed rotor 24 and the inner case 32 during operation of the gas turbine engine 10. To provide an accurate measurement, the sensor 40 needs to remain in contact with an inner case 32 of the case assembly 20, which carries the blade track.

As the engine 10 operates and experiences thermal and mechanical loads, the inner and outer cases 32, 34 may move relative to one another. The inner case 32 may expand and contract relative to the outer case 34, so the sensor 40 needs to be able to move radially while remaining coupled to the outer case 34.

Therefore, the sensor mount 42 is configured to load the sensor 40 against the inner case 32 and accommodate the relative motion between the inner case 32 and the outer case 34, while securing the sensor 40 to the outer case 34. The also allows the sensor 40 to remain engaged with the inner case 32 at a preselected contact pressure without being fixed to the inner case 32.

The sensor 40 includes a main housing body 46 and a shaft 48 as shown in FIG. 3. The main housing body 46 houses the other sensor components. The main housing body 46 defines a radially-inwardly facing surface 50 that engages a radially-outwardly facing surface 33 of the inner case 32. The shaft 48 extends radially outward away from the main housing body 46 to the sensor mount 42.

The sensor mount 42 includes a mount bracket 52, a collar 54, and at least one bias element 56 as shown in FIG. 3. The mount bracket 52 is coupled to the outer case 34 radially outward of the outer case 34. The collar 54 is coupled to the sensor 40 to define a shoulder surface 54S. The bias element 56 is arranged radially between the mount bracket 52 and the collar 54 coupled to the sensor 40 to apply the bias force to the sensor 40 to urge the sensor 40 radially inward into engagement with the inner case 32.

In the illustrative embodiment, the collar 54 is coupled to the shaft 48 of the sensor 40. The sensor mount 42 includes retention member 58 that fixes the collar 54 in place. The bias element 56 is arranged around the shaft 48 of the sensor 40.

In the illustrative embodiment, the bias element 56 is a conical spring washer. The sensor mount 42 may include more than one bias element 56 in the illustrative embodiment. For example, the sensor mount 42 may include a plurality of conical spring washers. In some embodiments, the bias element 56 is one of a conical spring, a coil spring, a wave spring, a leaf spring, or another suitable bias element configured to provide the preselected bias force to the sensor 40 so that the sensor 40 remains engaged with the inner case 32 with the desired contact pressure.

In the illustrative embodiment, the sensor mount 42 further includes a cover plate 60 and a seal 62 as shown in FIG. 3. The cover plate 60 is coupled to the outer case 34 radially inward of the collar 54 to locate the bias element 56 and the collar 54 radially between the mount bracket 52 and the cover plate 60. The shaft 48 of the sensor 40 extends radially outward through the outer case 34, the cover plate 60, and the mount bracket 52. The seal 62 is arranged to extend between the cover plate 60 and the sensor 40 to seal therebetween.

In the illustrative embodiment, the seal 62 is arranged to extend between the cover plate 60 and the shaft 48 of the sensor 40. The sensor 40 is located on the radially inward side of the cover plate 60.

In the illustrative embodiment, the sensor mount 42 further includes a gasket 70 and fasteners 72 as shown in FIG. 3. The gasket 70 is arranged between the cover plate 60 and the outer case 34. The fasteners 72 extend through the mount bracket 52 and the cover plate 60 into the outer case 34 to couple the mount bracket 52 and the cover plate 60 to the outer case 34.

The mount bracket 52 includes a mount wall 74, a mount arm 76, and a mount lip 78 as shown in FIG. 3. The mount arm 76 extends radially inward from the mount wall 74 toward the outer case 34. The mount lip 78 extends from the mount arm 76 to form a shoulder surface 78S. In the illustrative embodiment, the mount lip 78 engages the cover plate 60.

Turning back to the case assembly 20, the outer case 34 includes an outer case wall 36 and an outer case boss 38 as shown in FIG. 3. The outer case wall 36 extends circumferentially at least partway about the axis 11. The outer case boss 38 extends radially outward from the outer case wall 36. In the illustrative embodiment, an opening 37 extends radially through the outer case wall 36 and the outer case boss 38 and is open to the annular plenum 44.

In the illustrative embodiment, the cover plate 60 is coupled to the outer case 34 to close the opening 37. The sensor 40 extends through the opening 37 in the outer case 34, the cover plate 60, and the mount bracket 52.

A method of monitoring and controlling the tip clearance T during engine operation may include several steps. The method includes using the tip clearance sensor 40 to monitor the tip clearance T during use of the gas turbine engine 10. The method may further include applying the bias force to the sensor 40 to urge the sensor 40 radially inward into engagement with the inner case 32 and maintain the engagement between the sensor 40 and the inner case 32.

Figure 4:
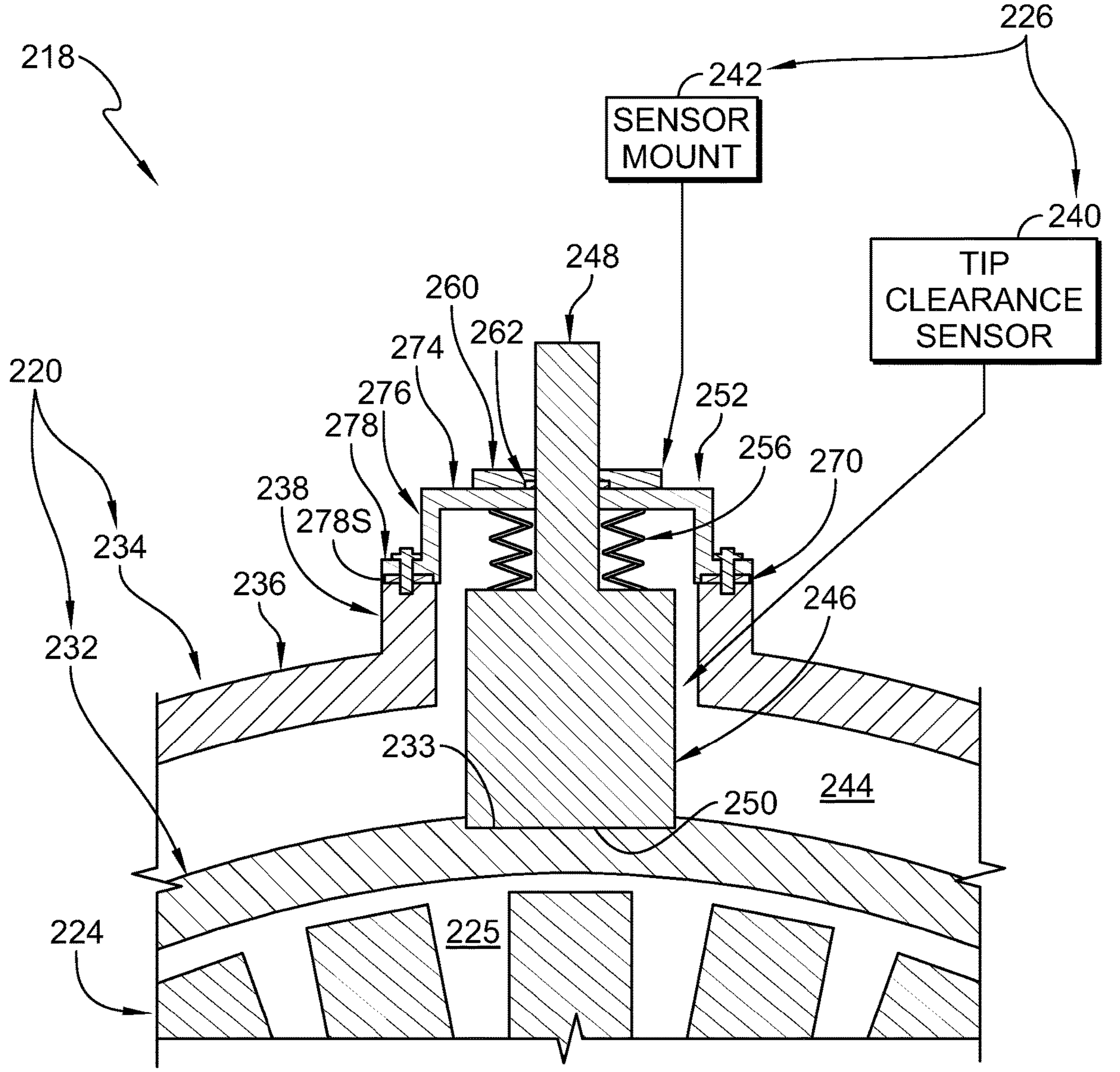
FIG. 4 is another embodiment of a tip clearance system adapted for use in the turbine section of FIG. 2 showing the bias element is arranged directly between the mount bracket and the sensor to apply the bias force to the sensor.

Another embodiment of a turbine assembly 218 in accordance with the present disclosure is shown in FIG. 4. The turbine assembly 218 is substantially similar to the turbine assembly 18 shown in FIGS. 1-3 and described herein. Accordingly, similar reference numbers in the 200 series indicate features that are common between the turbine assembly 18 and the turbine assembly 218. The description of the turbine assembly 18 is incorporated by reference to apply to the turbine assembly 218, except in instances when it conflicts with the specific description and the drawings of the turbine assembly 218.

The turbine assembly 218 includes a case assembly 220, a bladed rotor 224, and a tip clearance system 226 as shown in FIG. 4. The case assembly 220 includes an inner case 232 that extends circumferentially around the bladed rotor 224 and an outer case 234 extends circumferentially around the inner case 232 radially outward of the inner case 232.

The sensor 240 includes a main housing body 246 and a shaft 248 as shown in FIG. 4. The main housing body 246 houses the other sensor components. The main housing body 246 defines a radially-inwardly facing surface 250 that engages the radially-outwardly facing surface 233 of the inner case 232. The shaft 248 extends radially outward away from the main housing body 246 to the sensor mount 242 through the outer case 234.

The sensor mount 242 includes a mount bracket 252, a bias element 256, a cover plate 260, and a seal 262 as shown in FIG. 4. The mount bracket 252 is coupled to the outer case 234 radially outward of the outer case 234. The bias element 256 is arranged radially between the mount bracket 252 and the sensor 240 to apply the bias force to the sensor 240 to urge the sensor 240 radially inward into engagement with the inner case 232. The cover plate 260 is coupled to the mount bracket 252 radially outward of the mount bracket 252. The shaft 248 of the sensor 240 extends radially outward through the outer case 234, the cover plate 260, and the mount bracket 252. The seal 262 is arranged to extend between the cover plate 260, the sensor 240, and the mount bracket 252 to seal therebetween.

Unlike the sensor mount 42 in FIG. 3, the bias element 256 included in the sensor mount 242 is arranged directly between the mount bracket 252 and the housing body 246 as shown in FIG. 4. The bias element 256 extends around the shaft 248 and applies the bias force to the housing body 246.

The mount bracket 252 includes a mount wall 274, a mount arm 276, and a mount lip 278 as shown in FIG. 4. The mount arm 276 extends radially inward from the mount wall 274 toward the outer case 234. The mount lip 278 extends from the mount arm 276 to form a shoulder surface 278S. In the illustrative embodiment, a gasket 270 included in the sensor mount 242 is arranged between the mount lip 278 and the outer case 234.

Figure 5:
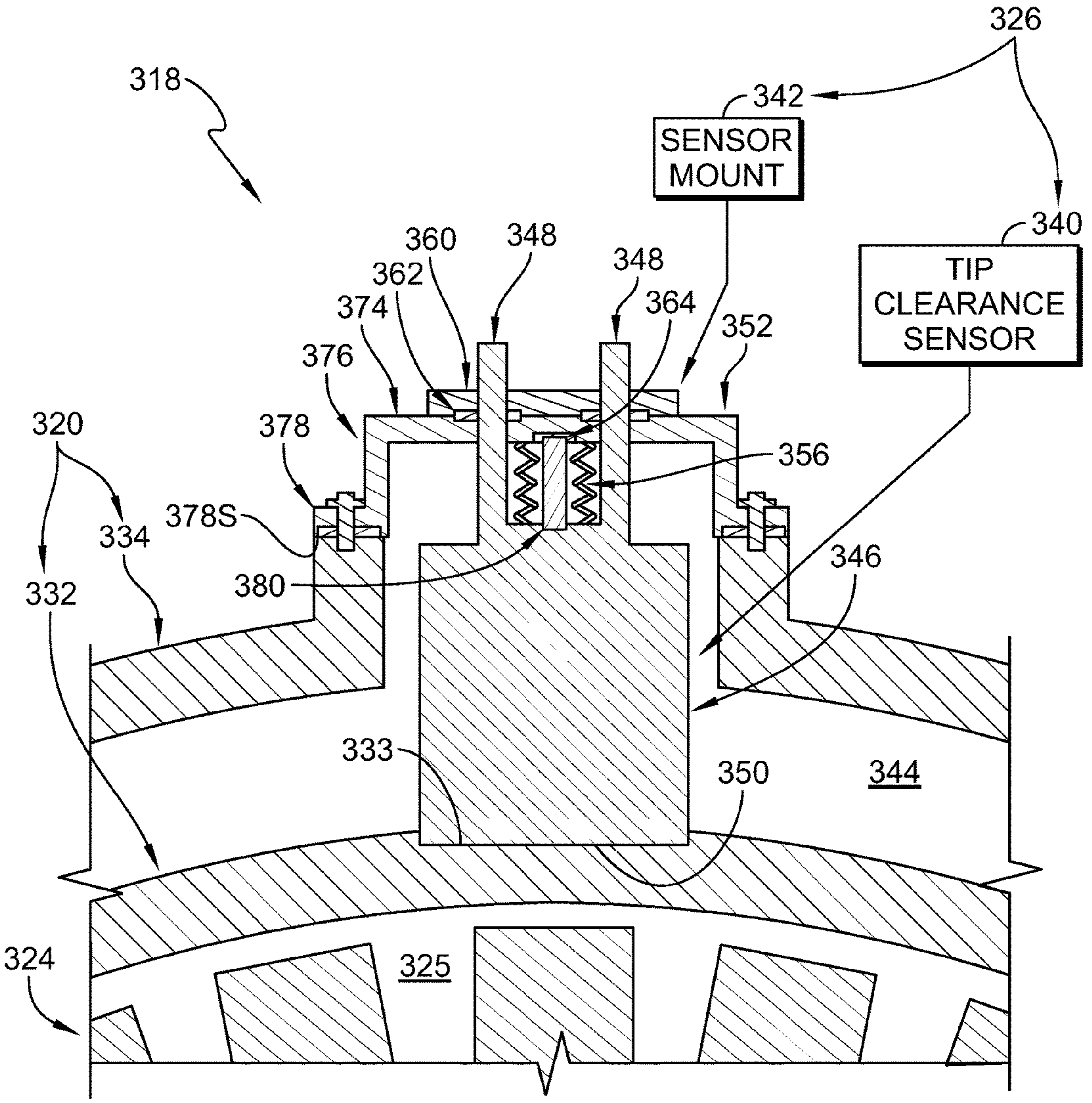
FIG. 5 is another embodiment of a tip clearance system adapted for use in the turbine section of FIG. 2 showing the bias element is located between a pair of shafts so that the bias element is arranged between the mount bracket and the sensor to apply the bias force to the sensor.

Another embodiment of a turbine assembly 318 in accordance with the present disclosure is shown in FIG. 5. The turbine assembly 318 is substantially similar to the turbine assembly 18 shown in FIGS. 1-3 and described herein. Accordingly, similar reference numbers in the 300 series indicate features that are common between the turbine assembly 18 and the turbine assembly 318. The description of the turbine assembly 18 is incorporated by reference to apply to the turbine assembly 318, except in instances when it conflicts with the specific description and the drawings of the turbine assembly 318.

The turbine assembly 318 includes a case assembly 320, a bladed rotor 324, and a tip clearance system 326 as shown in FIG. 5. The case assembly 320 includes an inner case 332 that extends circumferentially around the bladed rotor 324 and an outer case 334 extends circumferentially around the inner case 332 radially outward of the inner case 332.

The sensor 340 includes a main housing body 346, two or more shafts 348, and a bias element guide rod 380 as shown in FIG. 5. The main housing body 346 defines a radially-inwardly facing surface 350. The radially-inwardly facing surface 350 of the housing body 346 engages a radially-outwardly facing surface of the inner case 332. The shafts 348 extend radially outward away from the main housing body 346 to the sensor mount 342 through the outer case 334. The bias element guide rod 380 engages the main housing body 346 and extends radially outward toward the sensor mount 342. In the illustrative embodiment, there is a clearance gap 364 between the sensor mount 342 and the guide rod 380.

The sensor mount 342 includes a mount bracket 352, a bias element 356, a cover plate 360, and a seal 362 as shown in FIG. 5. The mount bracket 352 is coupled to the outer case 334 radially outward of the outer case 334. The bias element 356 is arranged radially between the mount bracket 352 and the sensor 340 to apply the bias force to the sensor 340 to urge the sensor 340 radially inward into engagement with the inner case 332. The cover plate 360 is coupled to the mount bracket 352 radially outward of the mount bracket 352. The shaft 348 of the sensor 340 extends radially outward through the outer case 334, the cover plate 360, and the mount bracket 352. The seal 362 is arranged to extend between the cover plate 360, the sensor 340, and the mount bracket 352 to seal therebetween.

In the illustrative embodiment, the bias element 356 is arranged in between the shafts 348 of the sensor 340. The guide rod 380 extends radially outward through the bias element 356 to locate the bias element 356 between the mount bracket 352 and the sensor 340 to apply the bias force to the sensor. The bias element 356 extends around the bias element guide rod 380.

In the illustrative embodiment, the one or more shafts 348 are arranged around the circumference of the bias element 356 as shown in FIG. 5. The bias element 356 is located between the shafts 348 in the illustrative embodiment, instead of extending around the shaft like in FIGS. 3 and 4.

The mount bracket 352 includes a mount wall 374, a mount arm 376 and a mount lip 378 as shown in FIG. 5. The mount arm 376 extends radially inward from the mount wall 374 toward the outer case 334. The mount lip 378 extends from the mount arm 376 to form a shoulder surface 378S. In the illustrative embodiment, there is a clearance gap 364 between the mount wall 374 and the guide rod 380 of the sensor 340.

Figure 6:
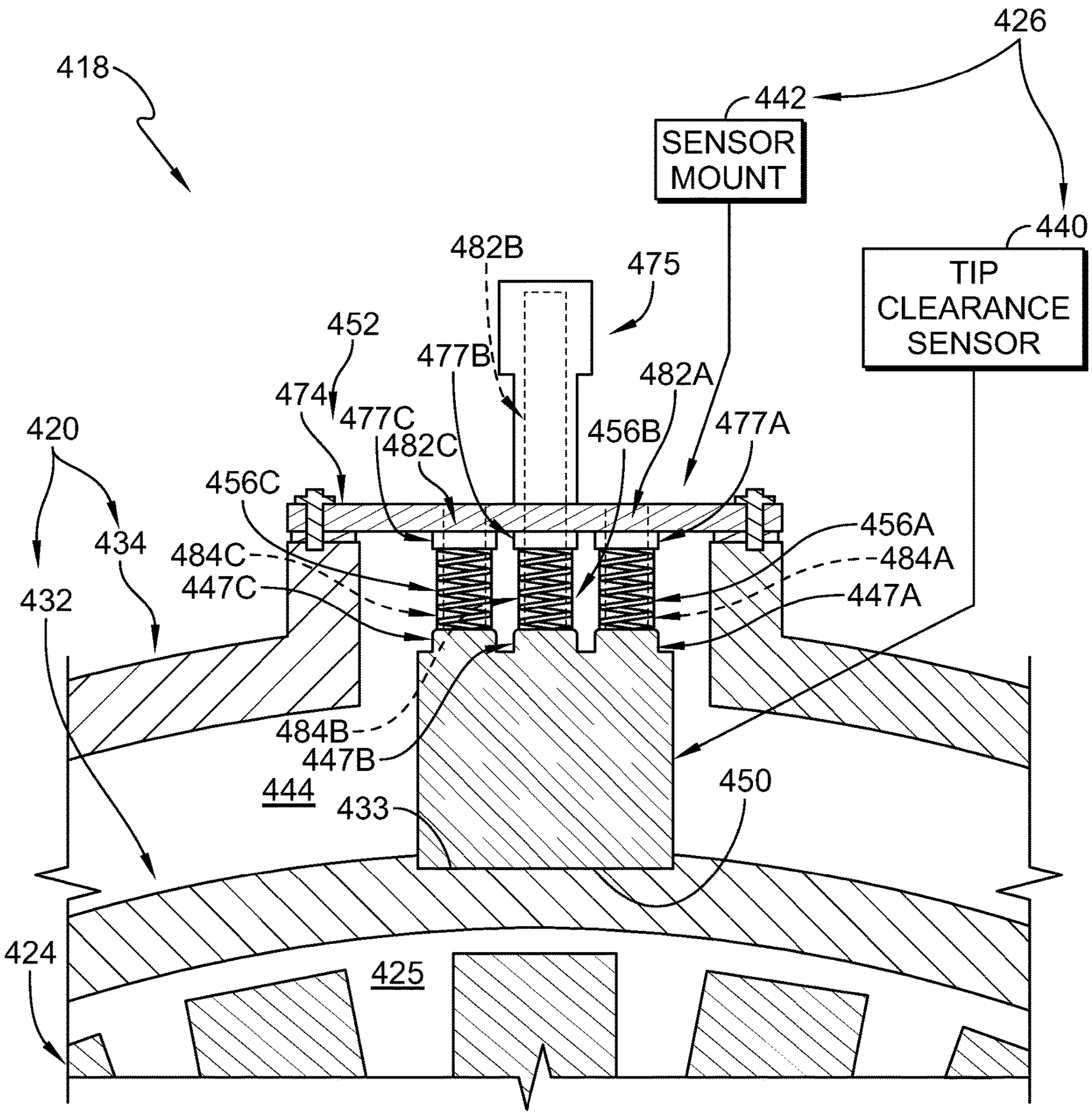
FIG. 6 is another embodiment of a tip clearance system adapted for use in the turbine section of FIG. 2 showing the bias element includes a plurality of flexible bellows seals that extend between and interconnect the mount bracket and the sensor to apply the bias force to the sensor.

Another embodiment of a turbine assembly 418 in accordance with the present disclosure is shown in FIG. 6. The turbine assembly 418 is substantially similar to the turbine assembly 18 shown in FIGS. 1-3 and described herein. Accordingly, similar reference numbers in the 400 series indicate features that are common between the turbine assembly 18 and the turbine assembly 418. The description of the turbine assembly 18 is incorporated by reference to apply to the turbine assembly 418, except in instances when it conflicts with the specific description and the drawings of the turbine assembly 418.

The turbine assembly 418 includes a case assembly 420, a bladed rotor 424, and a tip clearance system 426 as shown in FIG. 6. The case assembly 420 includes an inner case 432 that extends circumferentially around the bladed rotor 424 and an outer case 434 extends circumferentially around the inner case 432 radially outward of the inner case 432.

The sensor 440 includes a main housing body 446 and a plurality of housing bosses 447A-C as shown in FIG. 6. The main housing body 446 defines a radially-inwardly facing surface 450. The radially-inwardly facing surface 450 of the housing body 446 engages the inner case 432. The housing bosses 447A-C extend radially outward from the main housing body 446.

The sensor mount 442 includes a mount bracket 452 and a plurality of bias elements 456A-C as shown in FIG. 6. The mount bracket 452 is coupled to the outer case 434 radially outward of the outer case 434. The bias elements 456A-C are arranged radially between the mount bracket 452 and the sensor 440 to apply the bias force to the sensor 440 to urge the sensor 440 radially inward into engagement with a radially-outwardly facing surface 433 of the inner case 432.

The mount bracket 452 includes a mount wall 474, a mount shaft 475, and a plurality of mount bosses 477A-C as shown in FIG. 6. The mount wall 474 couples to the outer case 434. The mount shaft 475 extends radially outward away from the mount wall 474. The plurality of mount bosses 477A-C extend radially inward from the mount wall 474. Each bellows seal 456A-C extends between one of the mount bosses 477A-C on the mount bracket 452 to one of the housing bosses 447A-C on the sensor 440. In some embodiments, each bellows seal 456A-C extends directly between the mount wall 474 of the mount bracket 452 and the housing body 446 of the sensor 440.

In the illustrative embodiment, the mount bracket 452 includes a plurality of apertures 482A-C as shown in FIG. 6. The plurality of apertures 482 extend radially therethrough the mount bracket 452. Each bellows seal 456A-C forms a passageway 484A-C from the housing body 446 to the apertures 482A-C in the mount bracket 452. The passageways 484A-C allow for wiring and or cooling air to the sensor 440.

The present invention is a method to cool a tip clearance sensor 40, 240, 340, 440 in a gas turbine engine 10. This invention may be used in either the compressor 14 or turbine 18 of the engine 10; however, the example embodiment discussed here is mounted in the turbine 18.

The blades 30 are typically arranged around the outer diameter of a rotor 28. Stages of one or more bladed discs may be coaxially assembled to form a rotor which rotates about the axis 11. The bladed rotor 24 is housed with a static structure which may include an inner case 32 and an outer case 34. The inner surface of the static structure which is immediately adjacent to the tips of the blades 30 and surrounds the bladed rotor 24 may be referred to as the blade track. The blade track may be part of a separate component that attaches to the inner case 32, or it may be integral to the inner case 32 itself.

The radial distance between the tips of the blades 30 and the surrounding blade track 32 is the tip clearance T, which may be important to gas turbine engine performance. Sensors 40 may be used to monitor the tip clearance T during engine operation and may also be incorporated into an active control system which can measure and adjust the turbine tip clearance T for optimum performance.

In engines with an inner case 32, 232, 332, 432 and an outer case 34, 234, 334, 434, it may be desirable to mount the sensor 40, 240, 340, 440 on the exterior of the outer case 34, 234, 334, 434. However, to provide an accurate measurement the sensor 40, 240, 340, 440 needs to remain in contact with the inner case 32, 232, 332, 432, which carries the blade track. As the engine operates and experiences thermal and mechanical loads, the inner and outer cases 32, 34, 232, 234, 332, 334, 432, 434 move relative to one another. The present invention uses flexible components or bias elements 56, 256, 356, 456A-C to load the sensor 40, 240, 340, 440 against the inner case 32, 232, 332, 432 and accommodate the relative motion between the inner and outer cases 32, 34, 232, 234, 332, 334, 432, 434, while securing the sensor 40, 240, 340, 440 to the outer case 34, 234, 334, 434.

In FIG. 3, the sensor mount 42 includes conical spring washers 56 to load the sensor against the inner case 32. The sensor 40 is secured using a mount bracket 52 which bolts to the outer case boss 38 included in the outer case 34. The conical spring washers 56 react against the mount bracket 52 and press the sensor 40 against the inner case 32. The mount bracket 52 may not be fully enclosed in the illustrative embodiment, and the cover plate 60 closes the opening 37 to the plenum 44.

In FIG. 6, the sensor mount 442 uses flexible metallic bellows seals 456A-C as the bias elements 456A-C. Each bellows seal 456A-C provides passageways 484A-C for wiring and sensor cooling air.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine, the turbine assembly comprising a bladed rotor mounted for rotation about an axis of the gas turbine engine, a case assembly including an inner case that extends circumferentially around the bladed rotor to define an outer boundary of a gas path of the turbine assembly to block combustion products from moving through the gas path of the turbine assembly without interaction with blades included in the bladed rotor and an outer case that extends circumferentially around the inner case and is spaced radially outward of the inner case to define an annular plenum therebetween, and a tip clearance system including a tip clearance sensor located in the annular plenum to engage the inner case radially outward of the gas path of the turbine assembly and configured to monitor a tip clearance formed between the bladed rotor and the inner case during operation of the gas turbine engine and a sensor mount that extends between the outer case and the tip clearance sensor to apply a bias force to the tip clearance sensor to urge the tip clearance sensor radially inward into engagement with the inner case and maintain the engagement between the tip clearance sensor and the inner case, wherein the inner case is located radially between a terminal end of the tip clearance sensor and the blades of the bladed rotor.

2. The turbine assembly of claim 1, wherein the tip clearance sensor extends radially outward through the outer case and wherein the sensor mount includes a mount bracket coupled to the outer case radially outward of the outer case and at least one bias element arranged radially between the mount bracket and the tip clearance sensor to apply the bias force to the tip clearance sensor to urge the tip clearance sensor radially inward into engagement with the inner case.

3. The turbine assembly of claim 2, wherein the sensor mount further includes a collar coupled to the tip clearance sensor to define a shoulder surface and the at least one bias element is arranged radially between the mount bracket and the collar.

4. The turbine assembly of claim 3, wherein the sensor mount further includes a cover plate coupled to the outer case radially inward of the collar to locate the at least one bias element and the collar radially between the mount bracket and the cover plate and a seal member arranged to extend between the cover plate and the tip clearance sensor to seal therebetween.

5. The turbine assembly of claim 2, wherein the at least one bias element is arranged directly between the mount bracket and the tip clearance sensor to apply the bias force to the tip clearance sensor.

6. The turbine assembly of claim 5, wherein the sensor mount further includes a cover plate coupled to the mount bracket radially outward of the mount bracket and a seal member arranged to extend between the cover plate, the mount bracket, and the tip clearance sensor to seal therebetween.

7. The turbine assembly of claim 1, wherein the tip clearance sensor includes a main housing body that engages the inner case and at least one shaft that extends radially outward away from the main housing body to the sensor mount.

8. The turbine assembly of claim 7, wherein the sensor mount includes a mount bracket coupled to the outer case radially outward of the outer case and a bias element arranged around the at least one shaft of the tip clearance sensor and radially between the mount bracket and the tip clearance sensor to apply the bias force to the tip clearance sensor to urge the tip clearance sensor radially inward into engagement with the inner case.

9. The turbine assembly of claim 7, wherein the tip clearance sensor includes at least two shafts that each extend radially outward from the main housing body, and wherein the sensor mount includes a mount bracket coupled to the outer case radially outward of the outer case and a bias element arranged in a gap formed between the at least two shafts to locate the bias element radially between the mount bracket and the tip clearance sensor to apply the bias force to the tip clearance sensor to urge the tip clearance sensor radially inward into engagement with the inner case.

10. The turbine assembly of claim 1, wherein the sensor mount includes at least one bias element configured to apply the bias force to the tip clearance sensor to urge the tip clearance sensor radially inward into engagement with the inner case and wherein the at least one bias element is one of a conical spring washers, a conical spring, a coil spring, a wave spring, a leaf spring, and a bellows seal.

11. A gas turbine engine comprising a compressor configured to compress air drawn in to the gas turbine engine and discharge pressurized air, a combustor configured to mix fuel with the pressurized air from the compressor and ignites the fuel to produce hot, high pressure combustion products, a turbine assembly configured to receive the combustion products and to extract mechanical work form the combustion products as the combustion products move through the turbine assembly, the turbine assembly including a bladed rotor mounted for rotation about an axis of the gas turbine engine, a case assembly including an inner case that extends circumferentially around the bladed rotor and an outer case that extends circumferentially around the inner case and is spaced radially outward of the inner case to define an annular plenum therebetween, and a tip clearance system including a tip clearance sensor located in the annular plenum to engage the inner case and configured to monitor a tip clearance formed between the bladed rotor and the inner case during operation of the gas turbine engine and a sensor mount that extends between the outer case and the tip clearance sensor to apply a bias force to the tip clearance sensor to urge the tip clearance sensor radially inward into engagement with the inner case and maintain the engagement between the tip clearance sensor and the inner case, wherein the tip clearance sensor does not extend through the inner case.

12. The turbine assembly of claim 11, wherein the tip clearance sensor extends radially outward through the outer case and wherein the sensor mount includes a mount bracket coupled to the outer case radially outward of the outer case and at least one bias element arranged radially between the mount bracket and the tip clearance sensor to apply the bias force to the tip clearance sensor to urge the tip clearance sensor radially inward into engagement with the inner case.

13. The turbine assembly of claim 12, wherein the sensor mount further includes a collar coupled to the tip clearance sensor to define a shoulder surface and the at least one bias element is arranged radially between the mount bracket and the collar, a cover plate coupled to the outer case radially inward of the collar to locate the at least one bias element and the collar radially between the mount bracket and the cover plate, and a seal member arranged to extend between the cover plate and the tip clearance sensor to seal therebetween.

14. The turbine assembly of claim 12, wherein the at least one bias element is arranged directly between the mount bracket and the tip clearance sensor to apply the bias force to the tip clearance sensor.

15. The turbine assembly of claim 14, wherein the sensor mount further includes a cover plate coupled to the mount bracket radially outward of the mount bracket and a seal member arranged to extend between the cover plate, the mount bracket, and the tip clearance sensor to seal therebetween.

16. The turbine assembly of claim 11, wherein the tip clearance sensor includes a main housing body that engages the inner case and at least one shaft that extends radially outward away from the main housing body to the sensor mount.

17. The turbine assembly of claim 16, wherein the sensor mount includes a mount bracket coupled to the outer case radially outward of the outer case and a bias element arranged around the at least one shaft of the tip clearance sensor and radially between the mount bracket and the tip clearance sensor to apply the bias force to the tip clearance sensor to urge the tip clearance sensor radially inward into engagement with the inner case.

18. The turbine assembly of claim 16, wherein the tip clearance sensor includes at least two shafts that each extend radially outward from the main housing body, and wherein the sensor mount includes a mount bracket coupled to the outer case radially outward of the outer case and a bias element arranged in a gap formed between the at least two shafts to locate the bias element radially between the mount bracket and the tip clearance sensor to apply the bias force to the tip clearance sensor to urge the tip clearance sensor radially inward into engagement with the inner case.

19. The turbine assembly of claim 11, wherein the sensor mount includes at least one bias element configured to apply the bias force to the tip clearance sensor to urge the tip clearance sensor radially inward into engagement with the inner case and wherein the at least one bias element is one of a conical spring washer, a conical spring, a coil spring, a wave spring, a leaf spring, and a bellows seal.

20. A method comprising providing a turbine assembly adapted for use in a gas turbine engine, the turbine assembly comprising a bladed rotor mounted for rotation about an axis of the gas turbine engine, a case assembly including an inner case that extends circumferentially around the bladed rotor and an outer case that extends circumferentially around the inner case and is spaced radially outward of the inner case to define an annular plenum therebetween, and a tip clearance system including a tip clearance sensor located in the annular plenum to engage the inner case and configured to monitor a tip clearance formed between the bladed rotor and the inner case during operation of the gas turbine engine and a sensor mount that extends between the outer case and the tip clearance sensor to couple the tip clearance sensor to the case assembly, and applying a bias force to the tip clearance sensor to urge the tip clearance sensor radially inward into engagement with the inner case and maintain the engagement between the tip clearance sensor and the inner case, wherein the inner case is located radially between a terminal end of the tip clearance sensor and the blades of the bladed rotor.

* * * * *